United States Patent [19]

Niimi et al.

[11] 4,005,348

[45] Jan. 25, 1977

[54] CONTROL SYSTEM FOR DC MOTORS

[75] Inventors: Masayoshi Niimi, Toyota; Kinya Ishida, Kariya, both of Japan

[73] Assignee: Nippondenso Co., Ltd., Kariya, Japan

[22] Filed: May 16, 1975

[21] Appl. No.: 578,337

[30] Foreign Application Priority Data

May 21, 1974 Japan ............................. 49-57535
Apr. 2, 1975 Japan ......................... 50-45291U]

[52] U.S. Cl. .............................................. 318/373
[51] Int. Cl.² ......................................... H02P 5/16
[58] Field of Search .......... 318/261, 269, 373, 375, 318/439

[56] References Cited

UNITED STATES PATENTS

| | | | |
|---|---|---|---|
| 3,344,328 | 9/1967 | Morris | 318/269 X |
| 3,843,912 | 10/1974 | Anderson | 318/373 X |
| 3,854,076 | 12/1974 | Lambert | 318/373 X |

*Primary Examiner*—Robert K. Schaefer
*Assistant Examiner*—W. E. Duncanson, Jr.
*Attorney, Agent, or Firm*—Cushman, Darby & Cushman

[57] ABSTRACT

A DC motor control system is provided which is useful for plugging action in an electric-powered vehicle. In the system, a saturable transformer is employed as a means of increasing the reverse biasing time of a thyristor without increasing the capacity and voltage proof of a capacitor. As a result, an increased biasing time of the thyristor can be ensured.

7 Claims, 3 Drawing Figures

CONTROL SYSTEM FOR DC MOTORS

The present invention relates to a control system for a DC motor having a plugging function and designed for use with electric-powered vehicles and the like, and more particularly the present invention relates to such a control system wherein the commutation efficiency of a commutation circuit for commutating a main thyrister is improved and an electromagnetic switch for by-passing the main thyrister is efficiently wired.

In a control system for DC motors, the most important factor is the duration $T_{off}$ of the reverse biasing time required for turning off a main thyrister. However, DC motor control systems known in the art are disadvantageous in that to obtain such an increased reverse biasing time $T_{off}$, it is necessary to increase the amount of energy stored in a capacitor and hence it is necessary to increase the capacity of the capacitor or use a higher charging voltage thus increasing the size, weight and manufacturing cost of the system.

Accordingly, it is an object of the present invention to provide a control system for DC motors which is simple in construction and inexpensive to manufacture without a need to increase the capacity or charging voltage of a capacitor.

In accordance with the present invention, a control system for DC motors is provided in which a saturable transformer is used to fed back the magnitude of current flowing in the DC motor to a commutation circuit and the saturable transformer is operated in the unsaturated region only during the application of a reverse bias thus making it possible to effectively utilize the charge stored in a commutating capacitor and thereby to reduce the required capacity of the commutating capacitor to about one half that of the capacitor used in a conventional system having the similar commutation capacity with the resulting reduction in the size and manufacturing cost of the system. Also since the primary winding of the saturable transformer is connected in series with a field winding and a diode is connected across an armature, the current that flows in a main thyristor, i.e., the current that flows in the field winding during the plugging period may be fed back to the commutation circuit of the main thyristor and thus the charge on the commutating capacitor may be effectively utilized even during the plugging period, thus providing a plugging power control circuit which is compact and inexpensive to manufacture. Furthermore since the primary winding of the saturable transformer is connected in series with the main thyristor and a short-circuiting electromagnetic switch is connected in parallel across the series connection of the primary winding and the main thyristor, the power loss during the operation of the electromagnetic switch may be minimized.

These and other objects, features and advantages of the present invention will become readily apparent from considering the following detailed description in conjunction with the accompanying drawings, in which.

Figure 1:
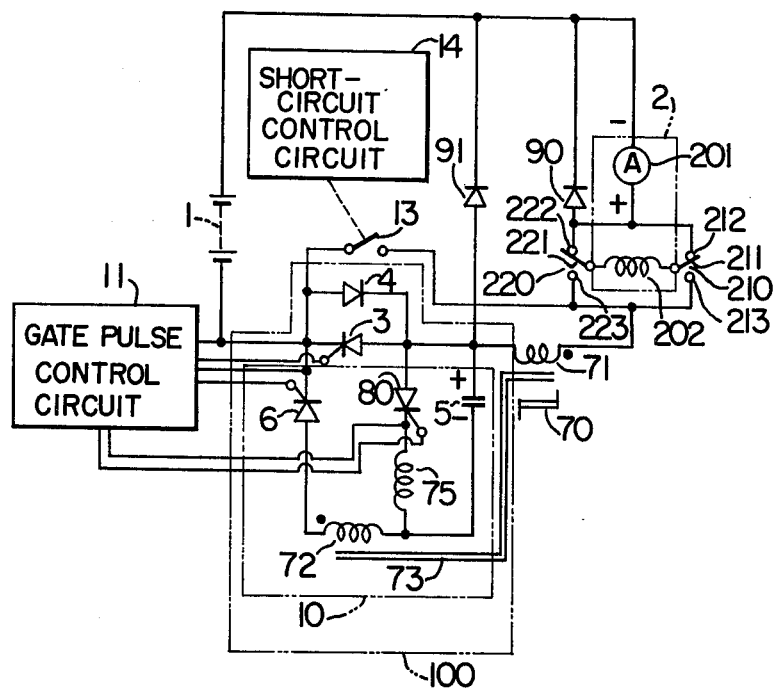
FIG. 1 is a wiring diagram of a first embodiment of a control system for DC motors according to the invention.

The present invention will now be described with reference to the embodiment shown in FIG. 1. In FIG. 1, numeral 1 designates a DC power source, 2 a load or a DC motor having an armature 201 and a field winding 202. The field winding 202 is connected to common terminals 211 and 221 of electromagnetic switches 210 and 220 for changing the direction of connections of the field winding 202 and changing the direction of rotation of the DC motor. Also the electromagnetic switches 210 and 220 are provided respectively with normally closed contacts 212 and 222 and normally open contacts 213 and 223. Numeral 3 designates a main thyristor, 4 a diode connected in inverse parallel relation with the main thyristor 3, 10 a commutation circuit for the main thyristor 3, 5 a commutating capacitor for the main thyristor 3, 6 a commutating thyristor for applying the charge on the commutating capacitor 5 to the main thyristor 3, 90 a first diode for absorbing the generated output of the DC motor during plugging, 91 a second diode for supplying return current to the DC motor 2, 13 an electromagnetic switch for by-passing the main thyristor 3, 14 a short-circuit control circuit for controlling the electromagnetic switch 13. Numeral 11 designates a gate pulse control circuit whereby gate pulses are alternately applied to the main thyristor 3 and the commutating thyristor 6 to turn on them. The gate pulse control circuit 11 may comprise, as for example disclosed in U.S. Pat. No. 3,361,921, a pair of oscillators which oscillate alternately and speed control means for varying the oscillation frequency of one of the oscillators. Numeral 75 designates a reversing reactor for reversing the charge on the commutating capacitor 5, 70 a saturable transformer, 71 a primary winding of the saturable transformer 70, 73 a core of the saturable transformer 70 made of ferrite or the like and adapted to feed back a motor current $I_0$ to the commutation circuit 10. Numeral 80 designates a reversing thyristor for reversing the charge on the commutating capacitor 5 which is turned on by a gate pulse generated in the gate pulse control circuit 11 simultaneously with that applied to the main thyristor 3. The electromagnetic switch 13 is designed to short-circuit the series circuit of the main thyristor 3 and the primary winding 71 of the saturable transformer 70. Numeral 100 designates a power control unit.

Figure 2:
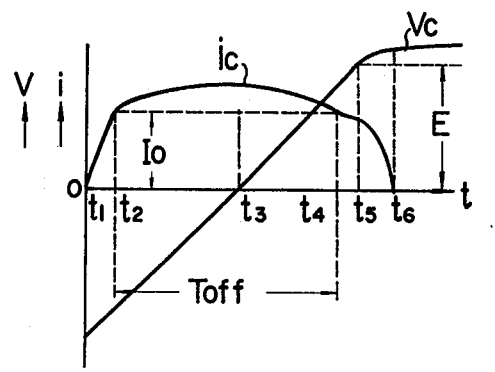
FIG. 2 is a characteristic diagram useful in explaining the operation of the embodiment shown in FIG. 1.

With the construction described above, the first embodiment operates as follows. Either the electromagnetic switch 210 or 220 is operated first to establish the main circuit and then the commutating thyristor 6 is turned on by a gate pulse from the gate pulse control circuit 11 thus supplying the charging current of the commutating capacitor 5 through a closed circuit consisting of the DC power source 1, the DC motor 2, the primary winding 71 of the saturable transformer 70, the commutating capacitor 5, the secondary winding 72 of the saturable transformer 70, the commutating thyristor 6 and the DC power source 1. When the charging of the capacitor 5 in the polarity shown in FIG. 1 is completed, the commutating thyristor 6 is automatically turned off. Then, when the main thyristor 3 and the reversing thyristor 80 are simultaneously turned on by gate pulses from the gate pulse control circuit 11, the load current $I_0$ flows through a closed circuit consisting of the DC power source 1, the DC motor 2, the primary winding 71 of the saturable transformer 70, the main thyristor 3 and the DC power source 1, and at the same time the charge stored on the capacitor 5 in the polarity shown is vibrationally reversed through a closed circuit consisting of the capacitor 5, the reversing thyristor 80, the reversing reactor 75 and the capacitor 5. When this reversion is completed, the polarity opposite to that shown is attained and the reversing thyristor 80 is turned off. In this condition, the core 73 of the saturable transformer 70 is saturated by the motor current $I_o$ flowing in the primary winding 71. Thereafter, when the commutating thyristor 6 is again turned on by a gate pulse from the gate pulse control circuit 11, the charge on the capacitor 5 which is now opposite in polarity to that shown is discharged through the secondary winding 72 of the saturable transformer 70, the commutating thyristor 6 and the diode 4 to cancel the motor current $I_o$ flowing in the main thyristor 3. In this case, if the turn ratio between the primary and secondary windings of the saturable transformer 70 is 1 : N with the value of N being selected N < 1 and N ≈ 1 and the windings are wound on the core 73 in such a manner that the currents flowing in the windings cancel the magnetic flux of each other, the current of the capacitor 5 varies as shown in FIG. 2. In other words, when the commutating thyristor 6 is turned on at a time $t_1$, since the core 73 of the saturable transformer 70 has been saturated by the load current $I_o$ flowing in the primary winding 71, the inductance of the secondary winding 72 of the saturable transformer 70 is so small that the current $i_c$ of the capacitor 5 rises immediately. When the capacitor current $i_c$ becomes high at a time $t_2$, since this capacitor current $i_c$ is flowing in the secondary winding 72 of the saturable transformer 70, the magnetic flux of the primary winding 71 is cancelled by the magnetic flux produced by the capacitor current $i_c$ flowing in the secondary winding 72 and the core 73 becomes unsaturated. In this case, since the number of turns in the secondary winding of the saturable transformer 70 is slightly smaller than that in the primary winding, the capacitor current $i_c$ greater than the motor current $I_o$ tends to flow so that all the motor current $I_o$ in the main thyristor 3 is taken by the capacitor current $i_c$ and the resulting excess current flows to the diode 4. Consequently, the forward voltage drop across the diode 4 is applied as a reverse bias to the main thyristor 3. During this period, the core 73 of the saturable transformer 70 becomes unsaturated and thus the inductance of the secondary winding 72 becomes considerably high. This increased inductance causes the capacitor 5 to oscillate and the current $i_c$ of the capacitor 5 varies only gradually. Consequently, the reverse biasing time $T_{off}$ is extended. Thereafter, when the increasing capacitor current begins to decrease at a time $t_3$ and the capacitor current again becomes equal to the motor current $I_o$ at a time $t_4$, the reverse bias applied to the main thyristor 3 is terminated. At this time, if the voltage across the commutating capacitor 5 is lower than a voltage E(V) of the DC power source 1, then the capacitor voltage is increased almost straightly up to the supply voltage E(V) by the load current $I_o$. (Here it is assumed that the DC motor 2 has an inductance large enough as compared to that in the commutation period of the commutation circuit.) Then, when the capacitor voltage $V_c$ reaches the supply voltage E at a time $t_5$ so that the flywheeling diode 91 is turned on, the energy stored in the reactor 7 by the load current $I_o$ is transferred to the capacitor 5 as a power supply and the transfer of the capacitor charge is completed at a time $t_6$ thus automatically turning off the commutating thyristor 6. In this operation, the oscillation period of the gate pulses to the main thyristor 3 and the commutating thyristor 6 is suitably controlled by the gate pulse control circuit 11 so as to control the power to the DC motor 2. Consequently, the capacitor current $i_c$ is confined to the saturable transformer 70 during the reverse biasing time $T_{off}$ between the times $t_2$ and $t_4$, and the energy which has heretofore been wasted is effectively utilized. When, for example, a condition results where the conduction rate of the main thyristor 3 exceeds a predetermined value or the rotational speed of the DC motor 2 becomes higher than a predetermined value, the short-circuit control circuit 14 which is for example similar to that disclosed in U.S. Pat. No. 3,361,921 comes into operation, thus closing the electromagnetic switch 13. In this way, no current flows in the other portions of the system while the electromagnetic switch 13 is in the closed position, thus providing a high efficiency semiconductor power control unit. Further, with the DC motor 2 rotating in one direction, the connections of the electromagnetic switches 210 and 220 may be changed so as to turn on and off the main thyristor 3. In other words, where the direction of excitation of the field winding 202 in the DC motor 2 is reversed to brake the DC motor 2 or rotate the DC motor 2 in the reverse direction (hereinafter these operations are generically called as plugging), during the period when the direction of excitation of the field winding 202 in the DC motor 2 is opposite to the direction of rotation of the armature 201, the DC motor 2 effectively operates as a DC shunt generator so that an electromotive force is generated across the armature 201 in the polarity shown and the resulting generated current flows through the diode 90. The torque produced in the armature 201 during this period is used as a braking force. If this operation is allowed to continue, the DC motor 2 may be operated in the reverse operation. In this case, the ratio between the on and off operations of the main thyristor 3 controls the magnitude of the excitation of the DC motor 2 and thus the braking force is controlled. Also, in this case, the current flowing in the main thyristor 3, i.e., the required commutation current is equal to the current flowing in the field winding 202 but smaller than the current flowing in the armature 201 by an amount equal to the current flowing in the diode 90. Therefore, the primary winding 71 of the saturable transformer 70 is provided so that it is connected in series with the field winding 202.

In accordance with the present invention, noting the fact that in FIG. 2 the charge effective for providing the reverse biasing time $T_{off}$ of the main thyristor 3 corresponds to the area enclosed by the current $I_o$ between the times $t_2$ and $t_4$ and the remainder, particularly the charge discharged by the current flowing in the diode 4, that is, the charge corresponding to the area of the capacitor current $i_c$ minus the load current $I_o$ during the time $t_2$ to $t_4$ is wasted, the charge is slowly discharged by the saturable transformer 7 during this period to reduce the charge heretofore wasted and thereby to extend the time during which the reverse bias is effectively applied to the main thyristor 3. Further, in the embodiment of FIG. 1, the main thyristor 3 and the reversing thyristor 80 to which gate pulses are simultaneously applied may be connected to the same oscillator in the gate pulse control circuit 11 through a pulse transformer (not shown) having two secondary windings.

Furthermore, the commutation circuit used in the embodiment of FIG. 1 is exemplary only and many different variations are possible. For example, the reversing thyristor 80 may be replaced with a diode. Further, the commutating thyristor 6 may also be replaced with a diode provided that the reversing thyristor 80 is used. It should also be readily apparent to those skilled in the art that the present invention is not limited to the described firing order of the respective thyristors. Still further, instead of changing the connections of the field winding 202, the connections of the armature 201 may be changed to reverse the direction of rotation of the DC motor 2.

Figure 3:
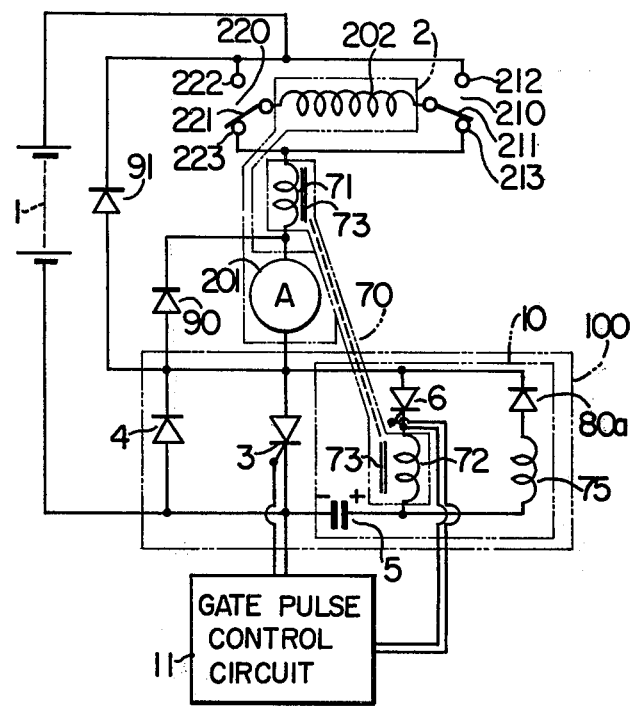
FIG. 3 is a wiring diagram of a second embodiment of the control system for DC motors according to the invention.

The second embodiment illustrated in FIG. 3 will now be described. The second embodiment differs from the first embodiment of FIG. 1 in that the electromagnetic switch 13 and the short-circuit control circuit 14 are eliminated and a reversing diode 80a is additionally provided in the power control unit 100.

With the circuit construction described above, the operation of the second embodiment is as follows. When either one of the electromagnetic switches 210 and 220 is closed, the voltage of the DC power source 1 is applied across the DC motor 2 and the main thyristor 3, after which, the commutating thyristor 6 is fired by a gate pulse from the gate pulse control circuit 11 and the commutating capacitor 5 is charged in the polarity shown. Thereafter, the main thyristor 3 is fired by a gate pulse from the gate pulse control circuit 11 so that power is supplied to the DC motor 2 and simultaneously the capacitor 5 is charged in the polarity opposite to that shown. Then, when the commutating thyristor 6 is fired by the trigger signal from the gate pulse control circuit 11 at the expiration of a time predetermined by a power regulating circuit which is not shown, the main thyristor 3 is reverse biased by the voltage drop developed across the reverse biasing diode 4 by the commutation current from the commutating capacitor 5. In other words, in this embodiment the commutation is initiated upon the firing of the commutating thyristor 6 so that the saturable transformer 70 is saturated during the initial period of the commutation by the field current of the DC motor 2 flowing in the primary winding 71, and the commutation current in the secondary winding 72 of the saturable transformer 70 rapidly increases thus causing the saturable transformer 70 to become unsaturated upon reaching the final current. Thereafter, due to the increased unsaturation inductance of the transformer, the commutation current of a magnitude close to the final current continues to flow. If the turn ratio of the saturable transformer 70 is selected so that this commutation current is slightly higher than the field current, current flows in the reverse biasing diode 4 and thus the main thyristor 3 is reverse biased and turned off by the voltage drop across the diode 4. During this commutation period, the effect of the present invention may be fully demonstrated in the operation of plugging the DC motor 2 by changing the connections of the electromagnetic switches 210 and 220 at the ends of the field winding 202 while the DC motor 2 is in operation. During this braking period, the DC motor 2 operates as a generator in response to the turning on and off of the main thyristor 3 and the generated current is circulated and absorbed through the armature 201 and the flywheeling diode 90. At the same time, the field current also flows in the armature 201. However, since the turn-off current of the main thyristor 3 during the braking period may be provided only by the field current, the armature current is not fed back as the load current to the commutation circuit 10, but the field current is fed back through the saturable transformer 70 and in this way the true load current of the main thyristor 3 is fed back and controlled to ensure an efficient DC motor control even during the plugging operation. Further, in FIG. 3 the reversing diode 80a may be replaced with a thyristor so that the thyristor is fired simultaneously with the firing of the main thyristor 3 or it is fired immediately before the firing of the commutating thyristor 6, and in this way even when the commutating capacitor 5 is charged in the polarity shown by the inductances at various points in the circuitry thus causing its stored charge to become greater than the supply voltage, it is prevented from being discharged to the power circuit thus further improving the utilization efficiency of the commutating capacitor 5. The commutation circuit 10 may be improved in many different manners. Further, noting the fact that while there are two types of diodes, i.e., one having a cooling fin mounting electrode at the anode and the other having such an electrode at the cathode, thyristors are all of the type which has such an electrode at the anode, as shown in FIG. 3, the anodes of the main thyristor 3, the commutating thyristor 6 and the flywheeling diodes 91 and 90 and the cathodes of the reverse biasing diode 4 and the reversing diode 80a are connected to the same potential and thus the requirements are met by a single cooling fin provided at their junction point.

It will thus be seen that in accordance with the present invention there is provided a DC motor control system in which the field current of a DC motor is returned to a commutation circuit through a saturable transformer so as to ensure an improved commutation efficiency, and in this way the generated current flowing in the armature of the DC motor during the plugging period is absorbed by different means thus ensuring an improved commutation efficiency without any detrimental effect on the plugging function.

What is claimed is:

1. A DC motor control system used for controlling a DC motor (2), comprising:
   a. a main circuit including a DC power source (1), a main thyristor (3) and a DC motor (2) which are connected in series with one another, said main circuit controlling power supplied to said DC motor (2) from said DC power source (1) in accordance with on and off operations of said main thyristor (3);
   b. a diode (4) connected in reverse parallel relation with said main thyristor (3);
   c. a commutation circuit having a reversing circuit including a commutating capacitor (5), a commutating reactor (75) and a first unidirectional element (80, 80a), said reversing circuit reversing a charge stored on said commutating capacitor (5) by a resonance circuit composed of said commutating capacitor (5) and said commutating reactor (75) through said first unidirectional element (80, 80a), and a reverse biasing charging circuit including a second unidirectional element (6) connected across the terminals of said main thyristor (3) through said commutating capacitor (5), said reverse biasing charging circuit reverse biasing said main thyristor (3) by causing a reversed charge on said commutating capacitor (5) to flow through said second unidirectional element (6) and said diode (4) and charging said commutating capacitor (5) from said DC power source (1) through said second unidirectional element (6), at least one of said first and second unidirectional elements (80, 6) consisting of a thyristor;

d. a gate pulse control circuit (11) connected to said main thyristor (3) and said thyristor (80, 6) in said commutation circuit for generating gate pulses to turn on said thyristors (3, 80, 6); and e. a saturable transformer (70) having a primary winding (71) provided in series circuit relation in said main circuit, a secondary winding (72) provided in series circuit relation in said reverse biasing charging circuit and a core (73) having said primary winding (71) and said secondary winding (72) wound thereon whereby current flows in each of said windings (71, 72) in such a manner that a magnetic flux produced by the current flowing in one of said windings (71, 72) cancels a magnetic flux produced by the current flowing in the other of said windings (71, 72) and said core (73) is saturated by a magnetic flux produced by the current flowing in said primary winding (71), said saturable transformer (70) returning the current flowing in said main circuit to said reverse biasing charging circuit for improving the commutation efficiency of said reverse biasing charging circuit.

2. A system according to claim 2, wherein a switch (13) is provided in parallel with said main thyristor (3) to supply power from said DC power source (1) to said DC motor (2) bypassing said main thyristor (3).

3. A system according to claim 1, wherein said main thyristor (3) and said primary winding (71) of said saturable transformer (70) are connected adjacent to each other, and a switch (13) is connected in parallel with a series circuit of said primary winding (71) and said main thyristor (3) to supply power to said DC motor (2) from said DC power source (1) bypassing said main thyristor (3) and said primary winding (71).

4. A system according to claim 1, wherein said DC motor (2) has a field winding (202) and an armature (201) connected in series with each other, and there are further provided switching means (210, 220) connected to said DC motor (2) for changing the direction of rotation of said DC motor (2), a first diode (9) connected in reverse parallel relation with a series circuit consisting of said DC motor (2), said primary winding (71) of said saturable transformer (70) and said switching means (210, 220) for returning and absorbing a counter electromotive force generated in said primary winding (71) and said DC motor (2), and a second diode (90) connected in reverse parallel relation with said armature (201) for returning and absorbing a power generated on plugging said DC motor (2), whereby the current in said field winding (202) flowing into said main circuit is returned to said reverse biasing charging circuit through said saturable transformer 70.

5. A system according to claim 4, wherein a switch (13) is connected in parallel with said main thyristor (3) to supply power from said DC power source (1) to said DC motor (2) bypassing said main thyristor (3).

6. A system according to claim 4, wherein said main thyristor (3) and said primary winding (71) of said saturable transformer (70) are connected adjacent to each other, and a switch (13) is connected in parallel with a series circuit consisting of said primary winding (71) and said main thyristor (3) to supply power to said DC motor (2) from said DC power source (1) bypassing said main thyristor (3) and said primary winding (71).

7. A DC motor control system used for controlling a DC motor (2), comprising:

a. a main circuit including, in series circuit relation with one another, a DC power source (1), a main thyristor (3), a DC motor (2) having an armature (201) and a field winding (202), a first reactor (71) and switching means (210, 220) for changing the connections of said field winding (202) to said DC power source (1), said main circuit controlling power supplied to said DC motor (2) from said DC power source (1) through said first reactor (71) in accordance with on and off operations of said main thyristor (3), said first reactor (71) positioned between said DC motor (2) and said main thyristor (3);

b. a first diode (90) connected in reverse parallel relation with said armature (201) for returning and absorbing a power generated upon plugging said DC motor (2);

c. a second diode (91) connected in reverse parallel relation with a series circuit consisting of said DC motor (2), said first reactor (71) and said switching means (210, 220) for returning and absorbing a counter electromotive force generated in said series circuit;

d. a switch (13) connected in parallel with a series circuit consisting of said first reactor (71) and said main thristor (3) for supplying power to said DC motor (2) from said DC power source (1) bypassing said series circuit;

e. a third diode (4) connected in reverse parallel relation with said main thyristor (3);

f. a reversing circuit including a commutation capacitor (5), a commutating reactor (75) and a reversing thyristor (80) for reversing a charge stored on said commutating capacitor (5) by a resonance circuit consisting of said commutating capacitor (5) and said commutating reactor (75) when said reversing thyristor (80) is turned on;

g. a reverse biasing charging circuit including a second reactor (72) and a commutating thyristor (6) connected across the terminals of said main thyristor (3) through said commutating capacitor (5) whereby when said commutating thyristor (6) is turned on a reversed charge on said commutating capacitor (5) is discharged through said second reactor (72) and said third diode (4) to reverse bias said main thyristor (3) and charge said commutating capacitor (5) from said DC power souce (1) through said commutating thyristor (6);

h. a gate pulse control circuit connected to said main thyristor (3), said reversing thyristor (80) and said commutating thyristor (6) for generating gate pulses for alternately turning on said commutating thyristor (6) and said main thyristor (3) and gate pulses for simultaneously turning on said main thyristor (3) and said reversing thyristor (80); and i. a core (73) having said first reactor (71) and said second reactor (72) wound thereon so that current in each of said reactors (71, 72) flows in such a manner that a magnetic flux produced by the current flowing in one of said reactors (71, 72) is cancelled by a magnetic flux produced by the current flowing in other of said reactors (71, 72) and said core (73) is saturated by a magnetic flux produced by the curent flowing in said first reactor (71), whereby the current flowing in said main circuit is returned to said reverse biasing charging circuit by said first and second reactors (71, 72) for improving the commutation efficiency of said reverse biasing charging circuit.

* * * * *